Aug. 21, 1956  O. W. STEELE  2,759,605
GRAVITY SEPARATOR

Filed Nov. 29, 1951  4 Sheets-Sheet 1

INVENTOR.
OLIVER W. STEELE
BY
Morgan, Finnegan & Durham
ATTORNEYS

INVENTOR.
OLIVER W. STEELE

Aug. 21, 1956  O. W. STEELE  2,759,605
GRAVITY SEPARATOR
Filed Nov. 29, 1951   4 Sheets-Sheet 3
Fig: 3.
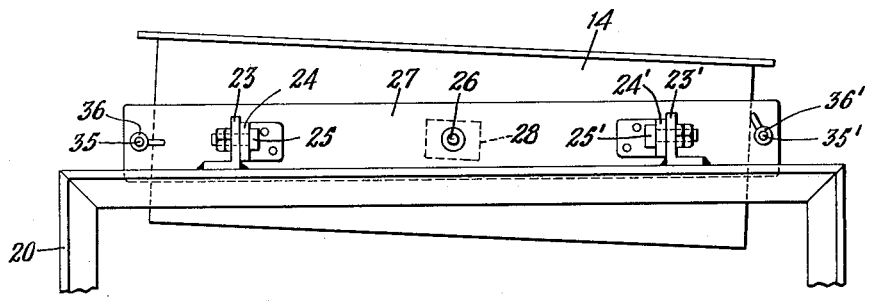
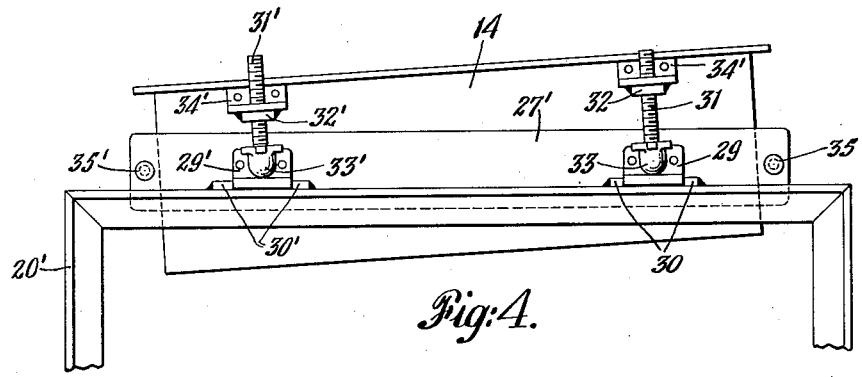
Fig: 4.
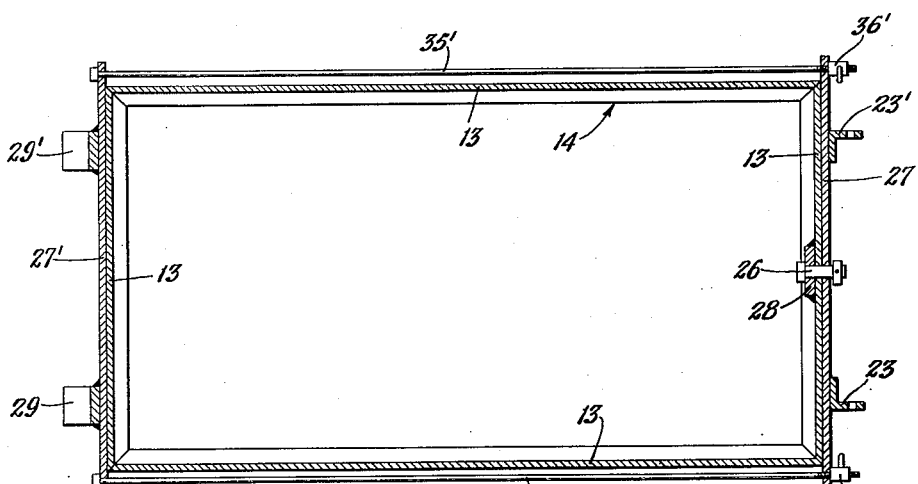
Fig: 5.
INVENTOR.
OLIVER W. STEELE
BY
Morgan, Finnegan & Durham
ATTORNEYS Aug. 21, 1956  O. W. STEELE  2,759,605
GRAVITY SEPARATOR
Filed Nov. 29, 1951  4 Sheets-Sheet 4
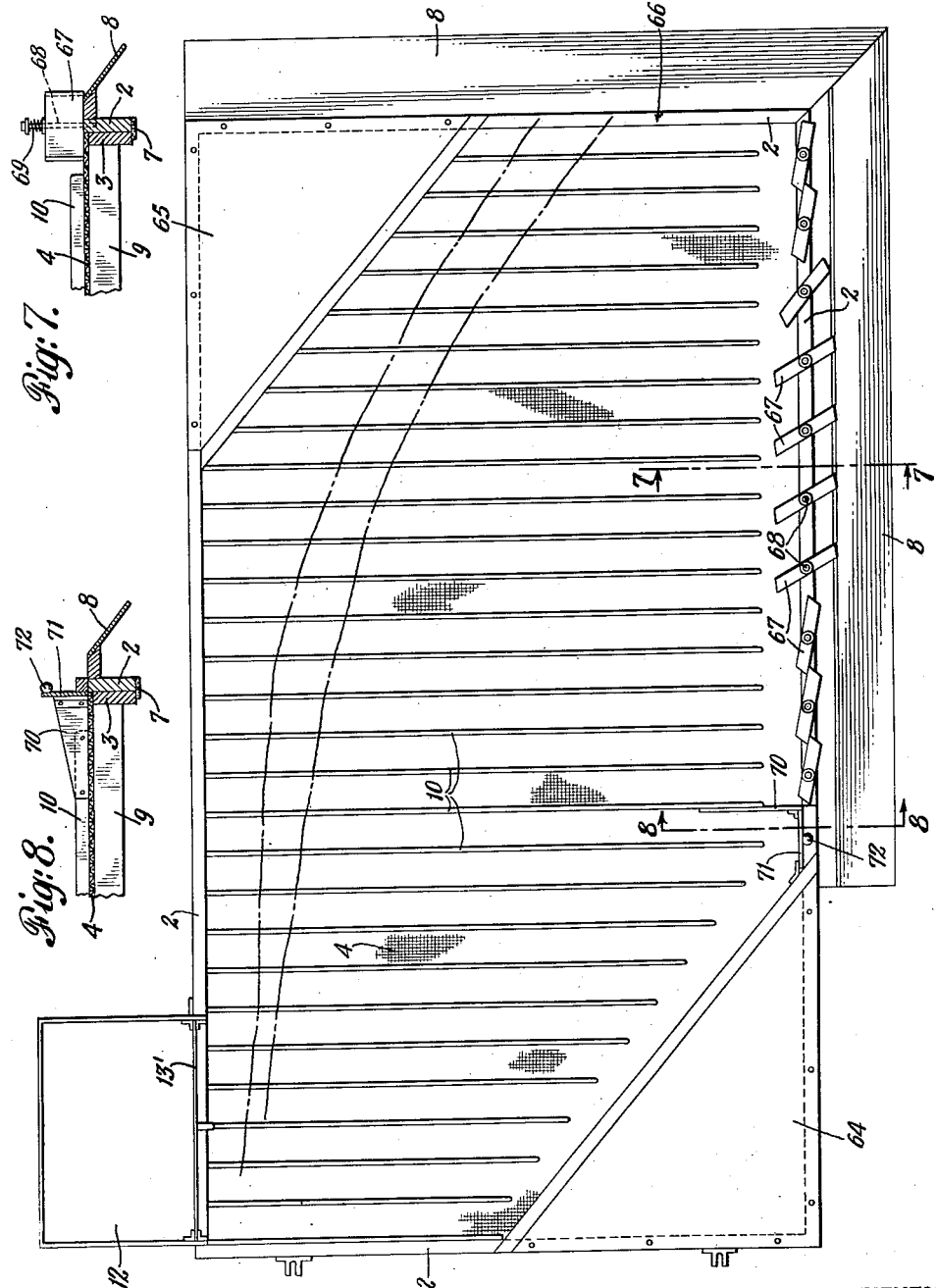
INVENTOR.
OLIVER W. STEELE
BY
Morgan, Finnegan + Durham
ATTORNEYS

2,759,605
GRAVITY SEPARATOR

Oliver W. Steele, Rocky Ford, Colo.

Application November 29, 1951, Serial No. 258,920

8 Claims. (Cl. 209—467)

The invention in general relates to a novel separator for separating granular materials by the forces of gravity, air pressure and mechanical vibration, hereinafter called a "gravity separator."

Objects and advantages of the invention will be set forth in part hereinafter and in part will be obvious herefrom, or may be learned by practice with the invention, the same being realized and attained by means of the combinations and improvements pointed out in the appended claims.

The invention consists in the novel combinations and improvements herein shown and described.

An object of my invention is to provide a novel gravity separator having multiple fans individually controlled, thus eliminating the need of air baffles or other air control means to regulate the flow of air across the deck of the separator.

Another object of my invention is to provide a novel mounting for a gravity separator in which the slope of the deck of the separator may be adjusted laterally or longitudinally or laterally and longitudinally.

A further object of my invention is to provide a novel gravity separator in which a single motor may be used for both reciprocating the deck and driving the fan assembly.

Another object of my invention is to provide a novel gravity separator having novel deck gates and also in which a "rock trap" is provided.

A further object of my invention is to provide a novel gravity separator which has a built-in air filter.

Another object of my invention is to provide a gravity separator in which the motor and fan assembly are positionable along with the deck assembly.

Another object of my invention is to provide a gravity separator capable of effecting separations at higher capacity and with lower power requirements than any gravity separator heretofore developed.

Another object of my invention is to provide a relative deep air chest to permit strong air blasts, and eddies, being discharged from the fans to become diffused against a cushion of compressed air, and thus cause an even flow of air through the previous deck cover.

Another object of my invention is to provide a gravity separator in which the cleaned elements in a mixture are forced to travel a relatively short distance and be discharged as "finished" product while the unseparated elements are retained on the separating surface a relatively longer period of time.

Another object of my invention is to greatly reduce, and in many cases completely eliminate the product commonly known in the art as the "middling" product.

The accompanying drawings, referred to herein and constituting a part hereof, illustrate the embodiments of the invention, and together with the description, serve to explain the principles of the invention.

Fig. 3 is a right side elevational view of the deck adjusting means.

Fig. 4 is a left side elevational view of the deck adjusting means.

Fig. 5 is a horizontal sectional view of the air chest and clamping plate.

Fig. 6 is an elevational view of the gravity separator deck.

Fig. 7 is a partial sectional view looking in the direction of the arrows 7—7 of Fig. 6 showing a novel deck gate.

Fig. 8 is a partial sectional view looking in the direction of arrows 8—8 of Fig. 6 showing a slidable deck gate through which rocks are discharged after being caught by a trap.

Figure 1:
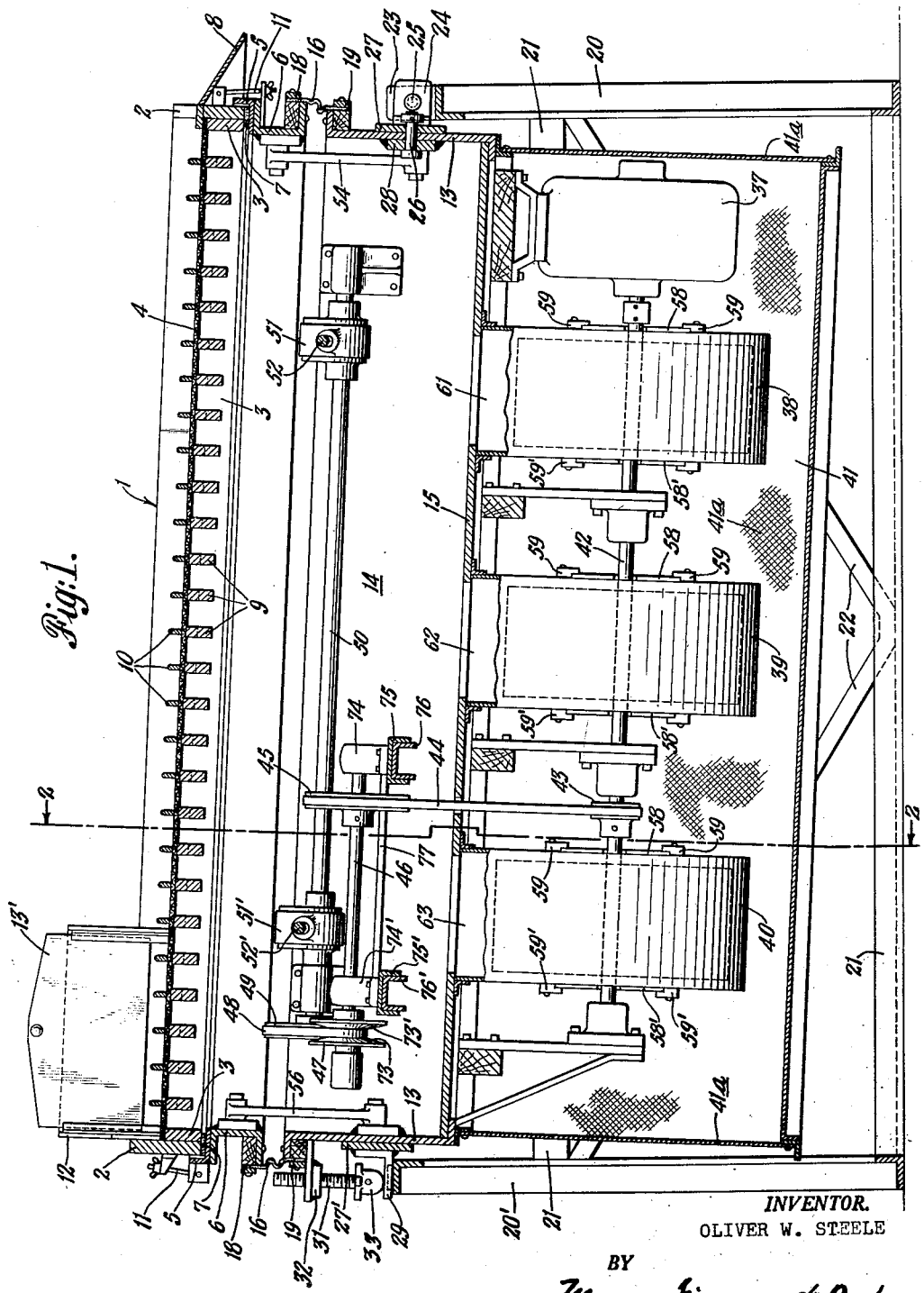
Fig. 1 is a vertical sectional view of one of the embodiments of my invention.

My gravity separator in general comprises a deck assembly including a deck cover of mesh wire cloth, a stationary air chest positioned below and connected to said deck assembly, a supporting frame connected to the sides of said stationary air chest, a fan housing including a number of individual fans connected to the bottom of said stationary air chest, and means for driving the fans and for imparting a reciprocating motion to the deck assembly.

In the gravity separator of this invention, the deck assembly is removably attached to the stationary air chest. This is a very desirable feature for it permits the operator to interchange the deck assembly so that deck assemblies of various sizes may be used depending upon the wishes of the operator.

One of the features of the invention is the novel deck positioning means, constituting geometrically a three-point support. The stationary air chest, which is below and supports the deck, is supported by a supporting frame structure. The supporting frame structure consists of two rectangular iron frames on end which form the sides of the supporting frame. These iron frames are connected by iron angles which form the front and rear portion of the supporting frame structure. Strut members are used as reinforcing members. On the top of the rectangular frames, which form the side members of the supporting frame structure, is positioned the air chest and deck positioning means. Since the deck is connected to the air chest, any change of position of the air chest will likewise be transmitted to the deck assembly.

The deck positioning means comprises hinge means positioned on the top of one of the rectangular side frames, said hinge means pivoted to a clamping plate to which the air chest is pivoted and two jack assemblies positioned on the opposite rectangular frame by which the air chest may be raised or lowered. If only one jack is raised or lowered, the air chest and deck are tilted laterally, while if both jacks are moved the same distance a longitudinal tilting movement is obtained, while if both jacks are moved but to different heights, the air chest and deck assembly are tilted both laterally and longitudinally.

Another feature of the invention is the novel multiple fan control. A fan housing, including a plurality of fans, is connected to the bottom of the air chest without separating partitions between the several fans, so that they all deliver air to the deck through a common open chest. Preferably, the air chest is relatively deep to permit strong air blasts and eddies, being discharged from the fans, to become diffused against a cushion of compressed air, and thus cause an even flow of air through the pervious deck cover. Each of the fans is provided with a fan gate to regulate the amount of air taken in by each fan. By this multiple fan control, the rate of flow of air may be varied across the deck. In this manner it is possible to supply air across different portions of the deck at whatever rate that is required, it being well known that in gravity separators it is not desirable to have a uniform supply of air across the entire deck to obtain the best separation, and that variations in air action are required for different types and conditions of materials. The construction of this invention eliminates entirely the need for and use of air baffles, deck zoning or other means to control the flow rate of air as used in the prior art. In the instant invention, a much more precise control of the air supply is obtained, without spurts, dead spots or eddies or deflection of upward flow, as occurs with the use of air baffles and other known types of air control.

My invention also provides another desirable feature in that the same motor may be used both for driving the fans and for imparting a reciprocating motion to the deck assembly. This is accomplished by means of a motor which drives a fan shaft on which are mounted the several fans. Mounted on and driven by the fan shaft is a pulley and belt assembly consisting of a number of pulleys, belts and shafts, one of said shafts being an eccentric shaft which drives a pair of eccentrics having eccentric rods which are connected to brackets attached to the deck assembly thus imparting a reciprocating motion to the deck assembly.

In the gravity separator of the present invention, the fan housing which includes both the fans and the motor is rigidly attached to the bottom of the air chest. Thus, when the air chest is adjusted to a desired position, the motor and fans will take the same position.

The gravity separator of this invention is also provided with a built-in air filter by having at least one of the sides of the fan housing made of a finely meshed wire cloth. In this way, the air entering the fan housing is filtered so that a substantially clean air is used in stratifying the particles to be separated. This type of fan housing is not desirable in dusty rooms, however, as the dust binds the filter quickly and it is therefore necessary to use an air duct to bring clean air into the machine from a remote source, usually outside the building. This may be accomplished by making the fan housing a dust tight compartment and providing said compartment with an air inlet opening for connection to an air duct leading to a remote source of air free of dust particles.

Another feature of my invention is the novel design of the deck itself by which the volume of the so called "middling product" is greatly reduced and in some cases completely eliminated. A large amount of "middling product" is obtained when there has not been a good separation of the heavy particles and light particles as clean products. The "middling product" is a combination of heavy and light particles.

In the decks commonly used in the past, the decks were so designed that the lighter particles traveled a relatively short distance from the feed to the deck. In many cases, however, this short travel was not of sufficient length to allow a thorough separation of the heavy and light particles which resulted in an excessive "middling" product which had to be either returned to the machine for further treatment or separated in another machine.

In order to reduce the volume of this so called "middling product," I have designed a deck in which the lighter elements are forced to travel a relatively longer distance than the heavier elements. This increased travel of the lighter elements permits a more thorough separation to take place and thereby reduces the volume of "middling product." The travel of the lighter elements is increased by increasing the width of the deck. As it is common practice to measure the capacity of a gravity separator by the amount of clean products produced, I have accordingly increased the capacity by reason of the reduction of the middling products.

Another feature of the invention is the provision of novel deck gates. One type of gate is a vertical pivotable member which when pivoted on the deck provides an opening for the desirable separated material to be removed. A second type gate is for removing rocks or other relatively very heavy particles which have been accumulated by a rock trap and it consists of a vertical slidable member which when raised provides an opening for the rocks to be discharged.

In order to describe the invention more specifically, reference is now made to the drawings. As shown in Fig. 1, 1 is a deck assembly comprising vertical plates 2 forming the back, front and sides of the deck, a rectangular reinforcing member 3 adjacent the inner surfaces of plates 2, an air-pervious deck cover 4 of fine mesh wire cloth, a rectangular supporting plate 5 and a rectangular deck frame 6. It is preferred that the deck be of sufficient width so that the lighter particles when placed on the deck will travel a relatively long distance so that a small amount of "middling product" as possible is obtained. An interposed felt lining 7 is provided between the rectangular supporting plate 5 and deck frame 6. Attached to the plates 2 is a discharge apron 8. The cover 4 is reinforced by supporting beams 9 on its undersurface, said beams being connected to plates 2. Riffles or separating strips 10 which direct the lower strata of stratified material are located on the top surface of the cover. The plates 2 are removably attached to deck frame 6 by means of connecting pins 11. Feed hopper 12, for supplying the material to be separated (such as seeds, grain or other intermixed particulate materials), has a vertical sliding gate so that the rate of feed of the material to be separated on the cover may be controlled.

The reciprocable deck assembly is positioned so as to be movable with respect to stationary air chest 14 in the following manner. The stationary air chest consists of four Z-shaped angle irons 13 which are connected to form the four sides of the chest, and a bottom plate 15. The lower surface of the deck frame 6 and the top surface of the air chest 14 are separated by a space. To permit movement between the deck and the air chest while confining the air to useful upward flow, the flexible seal 16, which may be made of canvas, is rectangular in shape and is fastened to rectangular strips 18 and 19 connected to the deck frame 6 and air chest 14 respectively by bolts 17. This flexible cloth connection extends on all four sides of the assembly to permit reciprocation of the deck with respect to the air chest 14, the latter being supported on a stationary supporting frame comprising two rectangular side frames 20—20' made of angle irons, joined by front and rear angle irons 21, said supporting frame reinforced by strut members 22 at the front and rear. As can be best seen in Fig. 3, there are mounted on the top surface of the side frame 20 two hinge members 23, 23' on which are pivotally mounted hinges 24, 24' by means of pivot pins 25, 25' respectively. Members 24 and 24' are fixed to clamping plate 27. The air chest 14 is pivotally mounted on clamping plate 27 for rocking about its longitudinal axis by means of pin 26, said pin 26 extending through said clamping plate 27 and reinforcing block 28 welded to end wall 13 of the air chest (Fig. 1). Mounted on the opposite end wall of the air chest is a clamping plate 27' on which are welded two angle irons 29, 29' whose horizontal portions rest on the top surface of side frame member 20'. Said irons 29 and 29' are equally spaced a substantial distance from the central longitudinal axis of the air chest 14. Resting on the angle irons 29, 29' are two jack screws 31, 31' having nut members 32, 32' and handwheels 33 and 33' respectively. The nut members have flanges 34, 34' which engage strips 19 so that the air chest is raised or lowered when one or both of the handwheels are turned.

When only one of the jacks is raised or lowered the slope of the air chest is tilted laterally by turning about pin 26; and if both are lowered or raised the same amount the air chest is tilted longitudinally on the hinges 24, 24';

while if both jack screws are moved but for different distances, the air chest is tilted both laterally and longitudinally. It will be noted that the lower ends of the jack screws are rounded to permit limited angular movements thereof on the supporting plates 30 and 30' of the angles 29 and 29'. Connecting clamping plates 27 and 27' are two clamping rods 35, 35' having clamping nuts 36, 36' so that the air chest may be clamped in a fixed position once it has been adjusted to the desired position by locking the nuts 36, 36'.

It will be apparent that, by the air chest mounting above described, all the usual and desired variations in deck inclination, such as end and side raises, can be imparted merely by manipulation of the two jack screws at one end of the machine. The hinge and pin construction at the opposite end provides for freedom of turning in two senses, that is about two axes normal to each other. In theory the front or discharge end of the deck could be considered as supported on a single universal joint, subject to the angular movements imparted from the two spaced jacks at the opposite end. However, by providing the hinges for tilting the deck about its transverse axis and the pin 26 for tilting about the longitudinal axis, a more stable structure with adequate freedom of motion is provided.

Reference is now made to Figs. 1 and 3 to illustrate the means for supplying air under pressure into the air chest and through the deck and also to impart a reciprocating motion to the deck assembly. Motor 37 and fans 38, 39 and 40 are all housed in a fan housing 41 which is rigidly connected to bottom 15 of air chest 14 by means of bolts or any equivalent fastening means. At least one of the sides 41a of the fan housing is airpervious, being made from a fine mesh cloth so that air entering the fan housing is filtered. The openings or mesh of the cloth are slightly smaller than those in the deck cover 4. Any dust particles flowing through the meshes of the filter cloth will be discharged through the meshes of the deck. Thus, binding of the deck surface is prevented. As mentioned previously, if the separator is used in a dusty room, the filter is eliminated and the fan housing is an air tight compartment provided with an air inlet opening (not shown) so that said housing many be connected to an air duct leading to a remote source of air free of dust particles.

By suspending the fan housing rigidly from the bottom of the air chest, the fan housing takes the same angular position as that to which the air chest and deck has been positioned. The advantage of having the fans and motor adjustable with the air chest and deck is that a more rigid support for the deck is obtained as the additional weight eliminates a large part of the vibration on the supporting frame and smoother and more efficient action results. The fans are driven by fan shaft 42 which also drives pulley 43 having mounted thereon a belt 44, which in turn drives pulley 45 in which is mounted a shaft 46 which is rotated and in turn drives V-pulley 47 having mounted thereon a belt 48, said belt 48 driving pulley 49 with pulley 49 driving shaft 50. Mounted on shaft 50 are two eccentrics 51, 51' so that when the shaft rotates, the eccentrics 51, 51' impart a reciprocating motion to eccentric rods 52, 52' which are connected to brackets 53, 53'. Since brackets 53, 53' are fixed to deck frame 6, the reciprocating motion of the eccentric rods 52, 52' is imparted to the deck. Four supporting links 54, 55, 56 and 57 are pivotally mounted at the top to the deck frame 6 and at the bottom to the air chest 14. It is evident, therefore, that only one motor is needed to drive the fans as well as to reciprocate the deck assembly. This is a decided advantage for it not only eliminates an extra driving means but also results in lower costs in operation.

Figure 2:
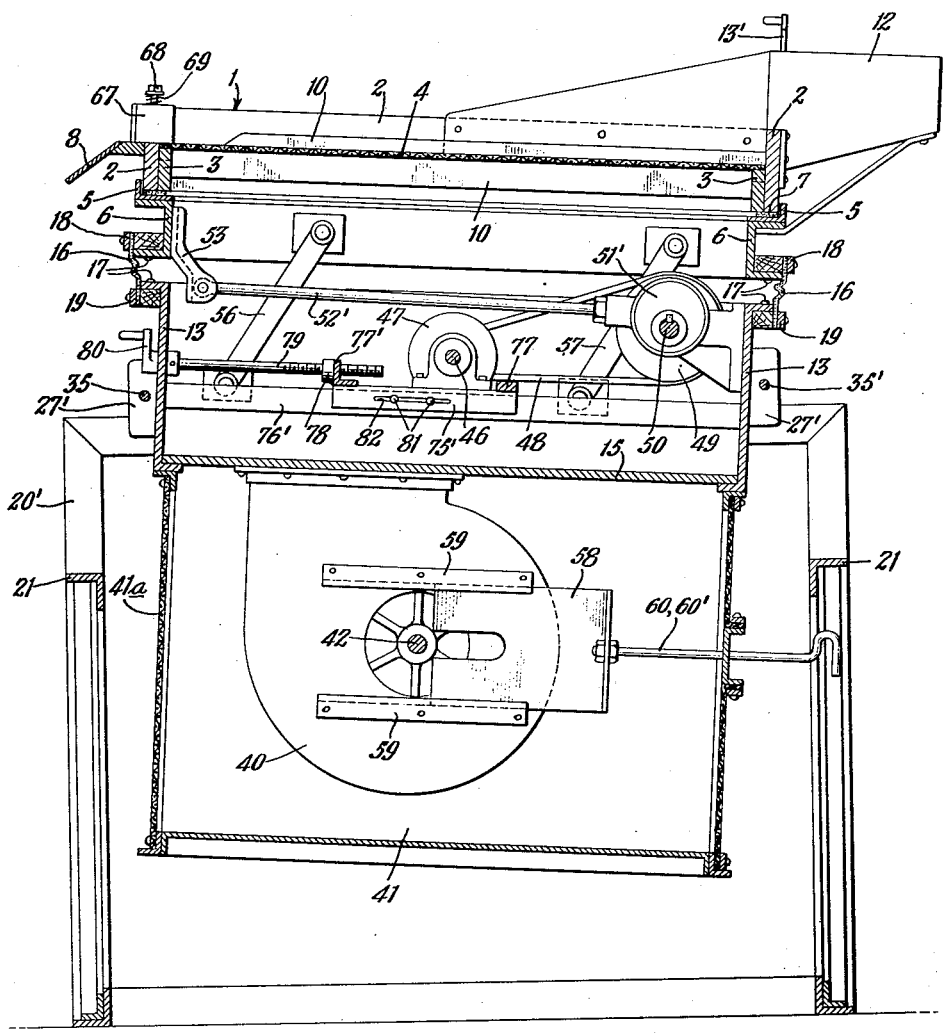
Fig. 2 is a sectional view looking in the direction of the arrows 2—2 of Fig. 1.

Each of the fans are provided with individual, manually-operable fan gates to control the amount of air entering the fans. As shown in Fig. 2, fan 40 is provided on each side with gates 58, 58' which slide in guides 59 and 59'. Each of the gates is manually operated by pulling handles 60, 60' respectively. Fans 38 and 39 are provided with identical gates. By this construction, the amount of air entering the air chest through openings 61, 62 and 63 can be controlled. For example, air may enter the open and continuous air chest through opening 63 at a rate much higher than through 61 depending upon the air gradient desired by the operator. The use of air baffles or other air control means is completely eliminated and a much more effective control of the rate of flow of the air at different parts of the deck is obtained, as previously stated.

Referring now to Fig. 6, diagonal banking rails 64 and 65 of known design are shown on the top of the deck cover, the former being for concentrating the heavier material being separated. The flotant lighter material can flow off the discharge apron at 66, while materials of intermediate densities or weights can be taken off through the gates 67 when open. Gate 67 as shown in detail in Fig. 7 is a block which is pivotable on its vertical axis by means of pin 68 and held against rotation by spring 69. By variously setting the plurality of gates 67, a variety of products can be delivered from the deck. A "rock trap" is provided by means of a high riffle 70 which catches the rocks or heaviest material, which are discharged through gate 71. Gate 71 is a vertical slidable gate which is raised by pulling upwardly on handle 72.

The speed at which the deck rotates may be controlled by varying the diameter of the V-pulley 47 consisting of sections 73, 73'. As shown in Figs. 1 and 2, the shaft 46 which drives pulley 47 is mounted in bearing blocks 74, 74' which in turn are supported on slide supports 75, 75' and 76, 76'. Slide supports 75, 75' are connected by the rods 77 and 77', said tie rods 77' having mounted thereon a nut 78 which receives a manually operable screw rod 79 journalled in air chest 14, the end of said screw rod having a crank 80. Pins 81 slidable in slot 82 prevent separation of slides 75, 75' from slides 76, 76'. As shown in Fig. 2, by turning the crank 80 clockwise, the slides 75, 75', on which the supporting structure of pulley 47 is mounted, move to the right which carries pulley 47 with it so that belt 48 moves deeper into the pulley 47, thus decreasing the diameter of the V-pulley 47, which in turn changes the speed of pulley 49.

The gravity separator, using air pressure and reciprocation with a permeable deck, has been used for at least 25 years for separating various other seeds and particulate material. Two separate and distinct actions take place on the deck: (1) stratification of the seed stock into vertical zones or strata according to their specific gravities and (2) the separation of the zones formed in the stratification step.

The stratification area is that section of the deck nearest the feed box. As the seeds flow from the feed box they immediately contact the upward flowing jets of air. These air jets, if properly regulated, will lift the lighter particles to the top of the seed bed while the heavier particles will rest at, or near the deck surface. Particles of intermediate weight will form zones between these two extremes. The stratification of the particles is therefore important, because, without good stratification it is impossible to obtain good separation.

The area of the deck necessary for proper stratification depends on the difference in specific gravities existing between the particles in the mixture. Particles differing widely in specific gravity wil stratify in a very small area of the deck. Particles closely approaching each other in specific gravity will require a larger area. Of course, as the stratification area increases in size, the separation area will decrease in size. As the separation area decreases, the volume of the middling product will increase, all of which means, lower capacity of the machine in clean products. Therefore, the trick for the operator to master is to so regulate his machine as to reduce the size of the stratification area.

The separating area, as mentioned above, is that portion of the deck remaining after the material becomes stratified. After the material has been stratified, the different zones are then separated by forcing the heavier zones to travel uphill while the lighter particles flow by gravity toward the side and rear of the deck. The uphill travel of the material is controlled by the longitudinal (lengthwise) adjustment of the deck, and the throw, and speed of the eccentrics. The sidewise flow of the material is controlled by the side tilt of the deck.

The stratification area, and the separating area, must be formed and maintained by accurate control of the air through the porous deck cover. Particles of the same size but differing slightly in weight will not stratify in a weak current of air. Neither will particles differing slightly in weight stratify in an excessively strong current of air. A weak current of air will not lift the light particles to the top of the mass and a strong current will lift all particles and thus cause a mixing action. The air flow must therefore be so regulated as to quickly place the particles differing in weights into vertical layers. A deck which has areas of weak and strong air currents cannot be a very efficient deck and one cannot expect good work from a deck in this condition. Therefore, there must be some means provided to control the flow of air through the deck cover.

From this discussion it is evident, therefore, that it is most important to obtain proper adjustment of the deck as well as proper control of the air across the deck. The shape of the deck used and the tilt of the deck depends upon the type of material to be separated. The same is true as to what the rate of the air flow should be across the various deck portions. In my novel separator the deck can not only be adjusted laterally, longitudinally and both laterally and longitudinally, but its adjustment is relatively simple. Furthermore, by the use of multiple fan control, the operator at all times has complete control of the rate at which the air flows across the deck, and local irregularities in air flow are avoided because all fans feed into the common open chamber. By providing a built-in filter the air is purified before it flows into the air chest and through the deck and thus insures the operator against any problems due to contamination of materials or blinding of the deck surface.

In the prior commercial separators, a single fan was used which discharged air into an air chamber which was broken up or "evened out" by air baffles or other air control means which resulted in immense back pressure on the fan which meant extra power was required. This waste of power is completely eliminated by using multiple fans in the separator of the present invention. In the past, closely woven deck covers were necessary to prevent the escape of air through the bed of material having a thin cross section, but this had the disadvantage that a sufficient amount of air could not pass through its particles where there was a thick bed of material and hence no stratification took place, which meant that there was poor separation. However, in the present separator where air baffles are eliminated and where multiple fans are used to control the air immediately under the deck to suit the thickness of the material above the discharge, low pressure fans may be used with more open mesh decks, which is a great saving in horsepower. Also, by having the same motor operate the fans and the deck reciprocating, a further saving in horsepower is obtained. Furthermore, by having the fan housing directly connected to the air chest much unwanted vibration of the supporting frame of the deck is eliminated.

In the present invention there is also provided novel gate means for removing the separated particles.

The invention in its broader aspects is not limited to the specific combinations and improvements described but departures may be made therefrom within the scope of the accompanying claims without departing from the principles of the invention and without sacrificing its chief advantages.

I claim:

1. In a pneumatic-pressure gravity separator having an air-pervious reciprocating deck for supporting a bed of granular materials of different specific gravities travelling thereover and undergoing stratification and separation under the combined actions of air levitation, vibration and gravity-induced flow, the improvement comprising an open-topped air chest having sides and a bottom defining an open substantially unobstructed air compartment disposed in underlying relation to said deck, said bottom of the air chest having a plurality of spaced unobstructed apertures therein, a plurality of fans, common drive means for said fans, each of said fans having the discharge thereof in unobstructed communication with said air compartment through a different one of said apertures for delivering air under pressure into said compartment for passage through the deck and the bed of materials thereon, means individually regulating the intake of each fan to regulate the air pressure delivered to various sections of the air compartment whereby the discharge of each individually regulated fan is unobstructedly directed into the air compartment and thence upwardly and unobstructedly to said deck.

2. A gravity separator comprising, in combination, a supporting structure, an open substantially unobstructed air chest carried by said structure, said chest including a bottom wall having a plurality of spaced apertures formed therein, an air pervious deck overlying said air chest and disposed in upwardly spaced substantially parallel relationship therewith, means providing reciprocatory movements to said deck in respect to said chest, a plurality of fans, common drive means for said fans, each of said fans having an outlet in open substantially unobstructed communication with said air chest through a different one of said apertures, means individually regulating the intake of each fan, whereby the discharge of each individually regulated fan is unobstructedly directed into the open air chest and thence upwardly through said deck.

3. The structure defined in claim 2 wherein said apertures are longitudinally spaced and said fans are in axially aligned longitudinally spaced relationship to said deck whereby air pressure created by the discharge of the fans can be regulated and varied longitudinally of the deck.

4. The structure defined in claim 2 wherein said means comprises gate elements slidably mounted on the intake of each fan.

5. The structure defined in claim 2 wherein said supporting structure comprises a pair of interconnected laterally spaced parallel generally vertically disposed supporting frames, and in further combination with means adjustably connecting said air chest to said supporting structure between said supporting frames for pivotal movements about a generally horizontal axis which is in adjacent laterally outwardly disposed parallel relationship with one side of said air chest and about an axis at right angles to said one side intermediate its ends, said deck being connected by said pivotal connecting means to said air chest for adjusting movements in common therewith about said axes for adjusting the slope of said deck laterally and longitudinally, said means comprising a longitudinally extending clamping plate disposed in laterally outwardly juxtaposed parallel relationship with one side of said air chest and in laterally inwardly disposed generally parallel relationship with one of said supporting frames adjacent the upper end thereof, a hinge including a pair of hinged members one being rigidly anchored to said clamping plate and the other being rigidly anchored to said one supporting frame, said pair of hinged members being relatively pivotally movable about a generally horizontal axis which is in adjacent laterally outwardly disposed parallel relationship with said one side of said air chest, a pivot pin connecting said clamping plate to said one side for relative pivotally swinging movements about the axis at right angles to said one side intermediate its ends, a pair of laterally outwardly projecting nut-forming members rigid with one other side of said air chest which is opposite said one side, and a pair of generally vertically disposed jack screws in laterally outwardly spaced parallel relationship with said one other side one in screw-threaded engagement with each of said nut-forming members, the lower ends of said jack screws being supported upon the other of said supporting frames for rotation and for limited angular movements about said ends with respect to said supporting structure.

6. The structure defined in claim 5 in further combination with a second longitudinally extending clamping plate anchored to said other supporting frame and disposed in laterally spaced generally parallel relationship with said first-mentioned clamping plate and in laterally outwardly juxtaposed generally parallel relationship with said one other side, and a pair of adjustable nut-equipped clamping rods extending between said clamping plates whereby said nuts may be tightened to frictionally engage said clamping plates with the adjoining side walls of said air chest.

7. A gravity separator comprising, in combination, a supporting structure, an open substantially unobstructed air chest including a bottom wall carried by said structure, said air chest having a plurality of spaced apertures formed therein an air pervious deck overlying said air chest, means for reciprocating the deck in relation to the chest, a plurality of fans, each of said fans having an outlet in open substantially unobstructed communication with said air chest through a different one of said apertures, means disposed externally of the flow path of said fan outlet for individually regulating each fan to regulate the air pressure and volume delivered to various sections of the chest, whereby the discharge of each individually regulated fan is unobstructedly directed into the air chest and thence upwardly and unobstructedly to the deck.

8. A gravity separator including, in combination, an air pervious deck carried by a supporting structure, means for reciprocating said deck, an open-topped substantially unobstructed air chest having the lower portion thereof provided with a plurality of spaced apertures disposed in underlying relation to the deck, a plurality of fans, each of said fans having the discharge thereof in open substantially unobstructed communication with the air chest through the apertures, means disposed externally of the flow path of the discharge of the fans for individually controlling the fans to regulate the air pressure and volume delivered to various sections of the chest, whereby the discharge of each individually controlled fan is unobstructedly directed into the air chest and thence upwardly and unobstructedly to the deck.

References Cited in the file of this patent

UNITED STATES PATENTS

| | | |
|---|---|---|
| 349,504 | Krause | Sept. 21, 1886 |
| 581,425 | Mait | Apr. 27, 1897 |
| 1,194,477 | Chevalier | Aug. 15, 1916 |
| 1,941,490 | Peale | Jan. 2, 1934 |
| 2,007,098 | Peale | July 2, 1935 |
| 2,075,747 | Nolte | Mar. 30, 1937 |
| 2,303,367 | Kendall | Dec. 1, 1942 |
| 2,321,514 | Reed | June 8, 1943 |

FOREIGN PATENTS

| | | |
|---|---|---|
| 10,713 | Great Britain | of 1888 |
| 242,188 | Great Britain | Nov. 5, 1925 |
| 375,046 | Great Britain | June 23, 1932 |
| 554,223 | Germany | July 6, 1932 |
| 646,639 | Great Britain | Nov. 29, 1950 |